2 Sheets—Sheet 1.

T. S. LEWIS.
Ore-Separator.

No. 207,879. Patented Sept. 10, 1878.

Witness:
Sam'l Hanson.
W. M. Sargent

Inventor:
Tristram S. Lewis,
by G. E. Bird, att'y

N. PETERS, PHOTO-LITHOGRAPHER, WASHINGTON, D. C.

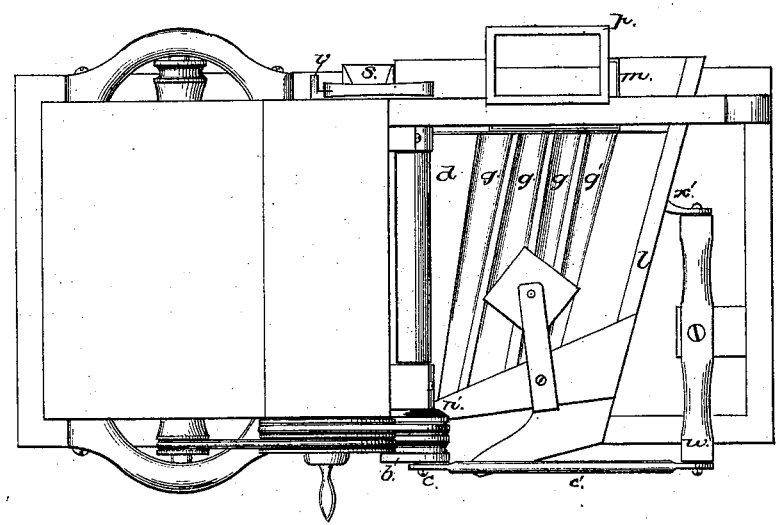

UNITED STATES PATENT OFFICE.

TRISTRAM S. LEWIS, OF SACO, MAINE.

IMPROVEMENT IN ORE-SEPARATORS.

Specification forming part of Letters Patent No. 207,879, dated September 10, 1878; application filed February 2, 1878.

*To all whom it may concern:*

Be it known that I, TRISTRAM S. LEWIS, of Saco, in the county of York and State of Maine, have invented certain new and useful Improvements in Ore-Separators; and I do hereby declare that the following is a full, clear, and exact description thereof, that will enable others skilled in the art to which it appertains to make and use the same, reference being had to the accompanying drawings, forming a part of this specification, in which—

Figure 1:
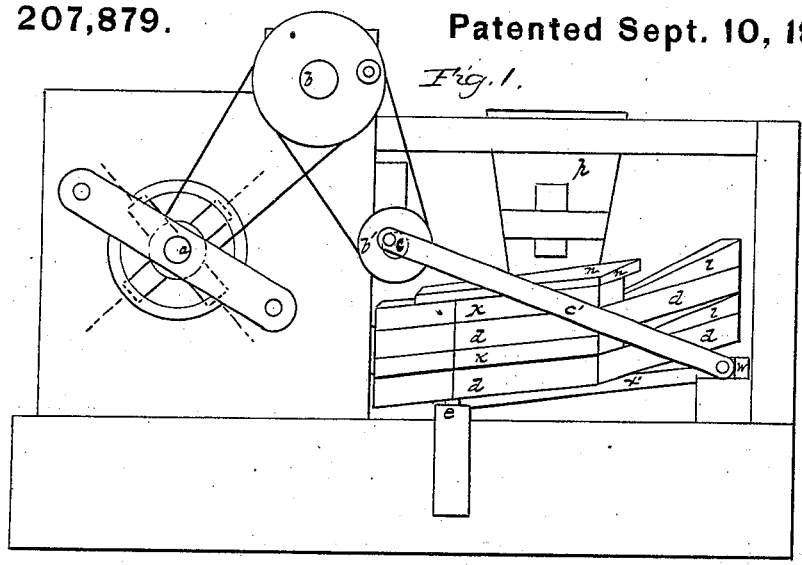
Figure 2:
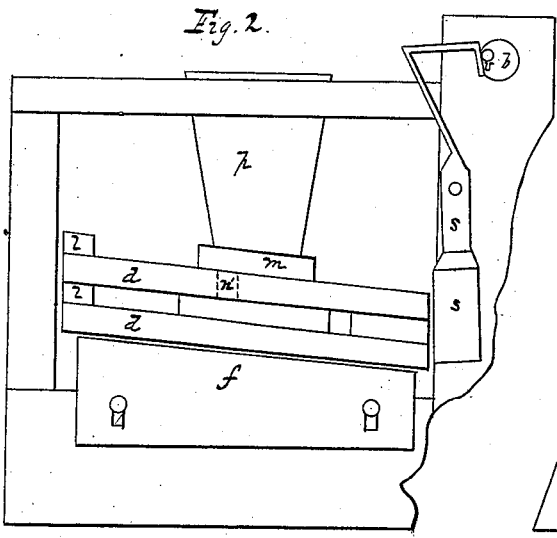
Figure 3:
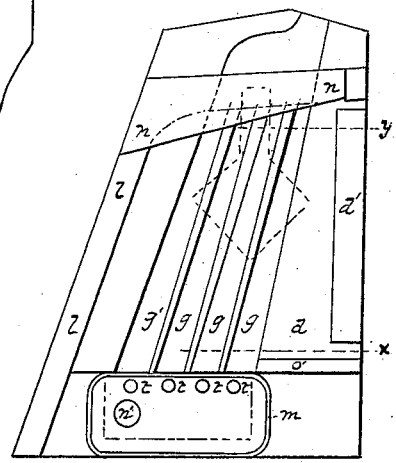
Figure 4:
Figure 5:

Figure 1 is a side elevation; Fig. 2, an elevation of the opposite side; Fig. 3, a plan of the table; Fig. 4, a cross-section of same at the point $x$, Fig. 3; and Fig. 5, a cross-section of same at the point $y$, Fig. 3.

My invention relates to the separation of ores from the stone in which they are embedded.

The separation of ores, after the crushing process, from particles of stone and other foreign matter is attended with difficulty. Various devices are in use for its accomplishment, some employing sieves, others blasts of air, intermittent or otherwise, and others still embodying both. These devices are more or less imperfect in result, either from the rapid destruction of the essential parts of the machine or the disadvantageous manner of applying the blast, or from other causes.

In my device the separation is effected by means of a continuous current of air passing over a platform or table having a peculiar arrangement of grooves and ledges, and provided with means for its oscillation.

The construction of the machine is as follows: $a$ is the shaft of an ordinary fan-blower, connected by a belt with the shaft $b$, which passes through the upper part of the air-tank, and to which power is applied. $c$ is another shaft, driven by a belt from the shaft $b$.

Directly in front of the mouth of the blower is placed the platform or table $d$, the narrower end of which is pivoted at $e$, while the other end is supported by the slotted slide $f$. The upper surface of the table is provided with the grooves $g\,g'$, arranged as in Fig. 3. The shape of the grooves at the line $x$ (see Fig. 3) is shown in Fig. 4, being circular, or nearly so, while at the point indicated by the line $y$ the grooves have gradually assumed the shape shown in Fig. 5, the perpendicular side $h$ of the groove being nearer the mouth of the blower. As the grooves approach the lower end of the table they should diminish somewhat in width and depth.

$k$ and $l$ are strips or ledges passing around the outer edges of the table. (See Fig. 3.) Over the ledge $k$ is placed the air-guide $n$, which projects beyond the ledge $k$. This air-guide has fixed upon it the air-guide $z$, which projects still farther over the surface of the table, as shown in dotted lines in Fig. 3. The upper end of the table is provided with the receptacle $m$, in the bottom of which are the openings $t\,t$, the grooves $g'\,g$, and when another table or tables are placed beneath the first the opening $n'$, which passes entirely through the table $d$. The air-guide $o'$ runs from the receptacle $m$ to the edge of the table.

Fixed to the frame of the machine is the hopper $p$, the lower end of which should be directly over the receptacle $m$. On the opposite side of the machine is pivoted the rapper $s$, which is substantially of the form seen in Fig. 2, and is so hung that it will naturally come in contact with the dog $v$ fixed eccentrically on the shaft $b$.

The under side of the table has pivoted to it the arm $x'$, the other end of which is pivoted to the arm $w$, which is, in turn, pivoted to the arm $c'$. The arm $c'$ receives motion from the wheel $b'$, to which it is pivoted, as seen in Fig. 1.

In operation the ground or broken particles of quartz, &c., are fed through the hopper, the delivery of which may be regulated by any of the usual devices into the receptacle $m$, whence, by means of the motion of the table imparted to it by the arms $c'$, $w$, and $x'$ and the rapper $s$, it is carried into the grooves $g'\,g$. By the continued motion of the table, and by means of the strokes of the rapper $s$, the particles of the ore are carried to the bottom of the grooves at the same time that they move toward the lower or narrower end of the table. By this means the particles of stone lying uppermost and being exposed to the action of air are carried toward the strip $l$, whence they are swept from the table by that portion of the current of air which passes contiguous to the curved strip $k$ and under the air-guide $n$. The purpose of the air-guide $z$ is to prevent the current of air from rising from the table. The table or platform $d$ should be higher at the wider end, and the desired slope or inclination is obtained by means of the slotted slide $f$. One or more tables may be placed beneath the first, the ore passing from the receptacle $m$ of the first to the next below through the aperture $n'$.

By means of the perpendicular side $h$ of the lower part of the groove the lighter, and consequently the uppermost, particles of ore are protected from the action of the blast.

What I claim as my invention, and desire to secure by Letters Patent of the United States, is—

1. In an inclined platform or table for the separation of ores, the grooves $g\ g'$, which are circular in shape at the upper end and gradually diminish in width and depth, substantially as shown, as and for the purposes set forth.

2. In combination with a suitable air-blowing device, a table or platform having the grooves $g\ g'$, inclined and oscillated, as and for the purposes set forth.

3. In combination with an air-blowing device, the inclined table having grooves $g\ g'$, air-strips $k$ and $l$, air-guides $o'$, $n$, and $n'$, substantially as and for the purposes set forth.

4. An inclined table having the grooves $g\ g'$, as described, in combination with the air-strips $k$ and $l$ and air-guides $n$, $n'$, and $o'$, as and for the purposes set forth.

In testimony that I claim the foregoing I have hereunto set my hand this 23d day of January, 1878.

TRISTRAM S. LEWIS.

Witnesses:
 GEO. E. BIRD,
 H. Q. GAY.